(12) United States Patent
Gan et al.

(10) Patent No.: US 12,543,102 B2
(45) Date of Patent: Feb. 3, 2026

(54) INFORMATION INDICATION METHOD AND APPARATUS

(71) Applicant: HUAWEI TECHNOLOGIES CO., LTD., Guangdong (CN)

(72) Inventors: Ming Gan, Shenzhen (CN); Dandan Liang, Shenzhen (CN); Xun Yang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/353,519

(22) Filed: Jul. 17, 2023

(65) Prior Publication Data

US 2024/0031915 A1    Jan. 25, 2024

Related U.S. Application Data

(63) Continuation of application No. 16/922,563, filed on Jul. 7, 2020, now Pat. No. 11,991,617, which is a
(Continued)

(30) Foreign Application Priority Data

Aug. 7, 2018  (CN) .......................... 201810891859.4

(51) Int. Cl.
*H04W 48/16*  (2009.01)
*H04W 48/08*  (2009.01)
*H04W 76/11*  (2018.01)

(52) U.S. Cl.
CPC ........... *H04W 48/08* (2013.01); *H04W 48/16* (2013.01); *H04W 76/11* (2018.02)

(58) Field of Classification Search
CPC ...... H04W 48/08; H04W 76/11; H04W 48/16
(Continued)

(56) References Cited

U.S. PATENT DOCUMENTS

2013/0070739 A1   3/2013   Mccann et al.
2014/0286242 A1   9/2014   Mccann et al.
(Continued)

FOREIGN PATENT DOCUMENTS

CN   106549738 A   3/2017
CN   107735994 A   2/2018
(Continued)

OTHER PUBLICATIONS

Cariou et al. (Intel), "EXtreme Throughput (XT) 802.11," IEEE 802.11-18/0789r10, May 8, 2018, 4 pages.
(Continued)

*Primary Examiner* — Mark G. Pannell
(74) *Attorney, Agent, or Firm* — Fish & Richardson P.C.

(57) ABSTRACT

The present disclosure relates to information indication methods and apparatus. One example method includes generating a first frame, where the first frame comprises a neighbor report element, the neighbor report element comprises a basic service set identifier (BSSID) field and a BSSID information field comprising a multi-band field, the multi-band field is used to indicate whether a neighbor access point (AP) indicated by the BSSID field is located in a multiple-band device, and the multiple-band comprises a 6 GHz band, and sending the first frame on a 2.4 GHz band or a 5 GHz band.

20 Claims, 7 Drawing Sheets

Related U.S. Application Data continuation of application No. PCT/CN2019/098412, filed on Jul. 30, 2019.

(58) Field of Classification Search
USPC ........................................................ 455/434
See application file for complete search history.

(56) References Cited

U.S. PATENT DOCUMENTS

| | | |
|---|---|---|
| 2015/0208330 A1 | 7/2015 | Park et al. |
| 2015/0230093 A1 | 8/2015 | Park et al. |
| 2017/0188191 A1 | 6/2017 | Aldana et al. |
| 2017/0223587 A1 | 8/2017 | Trainin et al. |
| 2018/0192421 A1 | 7/2018 | Ahn et al. |
| 2018/0199215 A1 | 7/2018 | Patil et al. |
| 2019/0037595 A1* | 1/2019 | Cherian .............. H04W 74/006 |
| 2019/0082373 A1* | 3/2019 | Patil ...................... H04L 1/1614 |
| 2019/0098565 A1* | 3/2019 | Cherian ................ H04W 48/16 |
| 2019/0268892 A1 | 8/2019 | Gidvani et al. |
| 2019/0297561 A1* | 9/2019 | Asterjadhi ............ H04L 5/0092 |
| 2019/0387524 A1* | 12/2019 | Asterjadhi ............ H04W 72/02 |
| 2020/0037325 A1 | 1/2020 | Chu et al. |
| 2021/0120587 A1* | 4/2021 | Murakami ........ H04W 74/0816 |
| 2021/0168856 A1* | 6/2021 | Cariou ................ H04W 74/004 |

FOREIGN PATENT DOCUMENTS

| | | |
|---|---|---|
| CN | 108141889 A | 6/2018 |
| EP | 3016440 A1 | 5/2016 |
| JP | 2006513600 A | 4/2006 |
| JP | 2015528660 A | 9/2015 |
| JP | 2016502775 A | 1/2016 |
| KR | 20150054626 A | 5/2015 |
| KR | 101639540 B1 | 7/2016 |
| WO | 2010068066 A2 | 6/2010 |
| WO | 2015195047 A1 | 12/2015 |
| WO | WO-2018232138 A1 * | 12/2018 |

OTHER PUBLICATIONS

Chu et al., U.S. Appl. No. 62/712,084, titled High Efficiency (HE) Operation At 6GHz Band, filed on Jul. 30, 2018, 13 pages.
CR for 6GHZ-Discovery by Laurent Cariou and IEEE P802.11 Wireless LANs, Dated Jan. 18, 2017, uploaded Jul. 9, 2018, 7 pages.
EPO Communication pursuant to Article 94(3) EPC issued in European Application No. 19848305.9 on Oct. 20, 2022, 10 pages.
Extended European Search Report issued in European Application No. 19848305.9 on Mar. 1, 2021, 11 pages.
IEEE Computer Society, "IEEE P802.11ax/D2.0; Draft Standard for Information Technology—Telecommunications and information exchange between systems Local and metropolitan area networks—Specific requirements; Part 11: Wireless LAN Medium Access Control (MAC) and Physical Layer (PHY) Specifications; Amendment 6: Enhancements for High Efficiency WLAN," , Oct. 2017, total 596 pages.
IEEE Computer Society, "IEEE Std 802.11ad-2012, Part 11: Wireless LAN Medium Access Control (MAC) and Physical Layer (PHY) Specifications; Amendment 3: Enhancements for Very High Throughput in the 60 GHz Band," Dec. 28, 2012, 628 pages.
IEEE Computer Society, "Std 802.Nov. 2016, IEEE Standard for Information technology-Telecommunications and information exchange between systems Local and metropolitan area networks-Specific requirements, Part 11: Wireless LAN Medium Access Control (MAC) and Physical Layer (PHY) Specifications," Dec. 2016, 3534 pages.
Listing of documents uploaded to https://mentor.ieee.org/802.11/documents showing date of "CR for 6GHZ-Discovery" by Laurent Cariou, 3 pages.
Office Action issued in Japanese Application No. 2020-533089 on Sep. 28, 2021, 6 pages (with English translation).
Office Action issued in Korean Application No. 2020-7020012 on Apr. 27, 2021, 10 pages (with English translation).
PCT International Search Report and Written Opinion issued in International Application No. PCT/CN2019/098412 on Oct. 15, 2019, 11 pages (partial English translation).
Patil et al., "Resolution for CID 11742," doc.: IEEE 802.11-17/1859r1, XP068122646, Jan. 2018, 9 pages.
EP Communication Pursuant to Article 94(3) EPC in European Appln No. 19848305.9 , dated Aug. 22, 2023, 9 pages.
Nokia et al., "Proposal on below 6GHz NR BS Conducted Receiver Requirements," 3GPP1 #84, R4-1707154, Berlin, Germany, Aug. 21-25, 2017, 4 pages.

\* cited by examiner

FIG. 3

| Element ID | Length | Element ID extension | HE operation parameter | BSS color information | Basic HE-MCS and NSS set | VHT operation information | Maximum co-located BSSID indication | 6 GHz operation information |
|---|---|---|---|---|---|---|---|---|
| 1 | 1 | 1 | 3 | 1 | 2 | 0 or 3 | 0 or 1 | 0 or 4 |

Byte:

FIG. 4

| Main channel | Channel control | Channel central frequency segment 0 | Channel central frequency segment 1 | Address information of a station operating on a 6 GHz band |
|---|---|---|---|---|
| 1 | 1 | 1 | 1 | 6 |

Byte:

FIG. 5

| Default PE duration | TWT request | TXOP duration RTS threshold | VHT operation information appearance | Co-located BSS | ER SU prohibition | 6 GHz operation information appearance | Address information appearance | Reserved |
|---|---|---|---|---|---|---|---|---|
| 3 | 1 | 10 | 1 | 1 | 1 | 1 | 1 | 5 |

Bit:

| Main channel | Channel control | Channel central frequency segment 0 | Channel central frequency segment 1 | BSSID | TSF difference information | Beacon frame interval |
|---|---|---|---|---|---|---|
| 1 | 1 | 1 | 1 | 6 | 8 | 1 |

Byte:

FIG. 6

| Main channel | Channel control | Channel central frequency segment 0 | Channel central frequency segment 1 | Operation class | BSSID | TSF value | Target beacon frame transmission time |
|---|---|---|---|---|---|---|---|
| 1 | 1 | 1 | 1 | 1 | 6 | 8 | 1 |

FIG. 7

| Element ID | Length | BSSID | BSSID information | Channel number | PHY type | Optional sub-element |
|---|---|---|---|---|---|---|
| 1 | 1 | 6 | 4 | 1 | 1 | Variable |

Byte:

FIG. 8

| Bit: | B0 | B1 | B2 | B3 | B4 B9 | B10 | B11 | B12 | B13 | B14 | B15 | B16 | B17 B31 |
|---|---|---|---|---|---|---|---|---|---|---|---|---|---|
| | AP reachability | Security | Key range | | Capability | Mobility domain | High throughput | Very high throughput | FTM | High efficiency | High efficiency ER BSS) | Co-location AP | Reserved |
| | 2 | 1 | 1 | | 6 | 1 | 1 | 1 | 1 | 1 | 1 | 1 | 15 |

FIG. 9a

| Bit: | B0 | B1 | B2 | B3 | B4 B9 | B10 | B11 | B12 | B13 | B14 | B15 | B16 | B17 | B18 B31 |
|---|---|---|---|---|---|---|---|---|---|---|---|---|---|---|
| | AP reachability | Security | Key range | | Capability | Mobility domain | High throughput | Very high throughput | FTM | High efficiency | High efficiency ER BSS) | Co-location AP | Multi-band | Reserved |
| | 2 | 1 | 1 | | 6 | 1 | 1 | 1 | 1 | 1 | 1 | 1 | 1 | 14 |

FIG. 9b

| Element ID | Length | Maximum BSSID indication | Optional sub-element |
|---|---|---|---|
| 1 | 1 | 6 | Variable |
Byte:
FIG. 10
| Element ID | Length | BSSID sequence number | DTIM period (optional) | DTIM count (optional) |
|---|---|---|---|---|
| 1 | 1 | 1 | 1 or 0 | 1 or 0 |
Byte:
FIG. 11
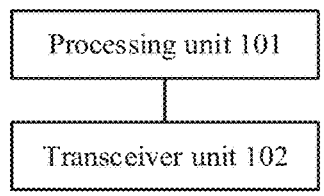
FIG. 12
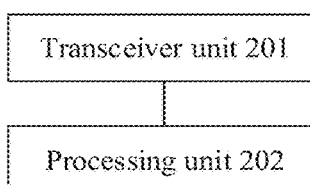
FIG. 13

INFORMATION INDICATION METHOD AND APPARATUS

CROSS-REFERENCE TO RELATED APPLICATIONS

This application is a continuation of U.S. patent application Ser. No. 16/922,563, filed on Jul. 7, 2020, which is a continuation of International Application No. PCT/CN2019/098412, filed on Jul. 30, 2019. The International Application claims priority to Chinese Patent Application No. 201810891859.4, filed on Aug. 7, 2018. All of the aforementioned patent applications are hereby incorporated by reference in their entireties.

TECHNICAL FIELD

Embodiments of this application relate to the communications field, and in particular, to an information indication method and apparatus in the communications field.

BACKGROUND

A frequency range of a newly opened 6 GHz band is more than 1 GHz. An unassociated non-access station (Non AP Station) or a non-access station (Non AP Station) in a roaming state needs to actively scan the band more than 1 GHz to obtain information about a surrounding access point AP. The following manner is used: continuously switching to each channel of the band more than 1 GHz, sending a probe request frame Probe Request through broadcasting to obtain a probe response frame responded with by a surrounding AP, and then selecting an appropriate AP for association. However, disadvantages of this method are long duration, high energy consumption, and unnecessary congestion on the 6 GHz band.

SUMMARY

According to an information indication method and apparatus provided in embodiments of this application, a sender station can accurately indicate an address of a station operating on a 6 GHz band. Therefore, an unassociated receiver station or a receiver station in a roaming state can be accurately associated with and directionally communicate with the station operating on the 6 GHz band, after learning of the address of the station operating on the 6 GHz band.

According to a first aspect, an embodiment of this application provides an information indication method, including:

generating a first frame, where the first frame includes address information of a station operating on a 6 GHz band; and sending the first frame on a 2.4 GHz band and/or a 5 GHz band.

It should be understood that, a sender station sends the first frame on the 2.4 GHz band and/or the 5 GHz band, and the first frame includes address information of the station operating on the 6 GHz band.

In this embodiment of this application, the sender station can accurately indicate an address of the station operating on the 6 GHz band. Therefore, an unassociated receiver station or a receiver station in a roaming state can be accurately associated with and directionally communicate with the station operating on the 6 GHz band, after learning of the address of the station operating on the 6 GHz band.

In a possible implementation of the first aspect, the address information is located in a 6 GHz operation information field of an HE operation element of the first frame.

In a possible implementation of the first aspect, an HE operation parameter field of the HE operation element of the first frame includes indication information for indicating whether the address information appears. When the indication information is a first value, the address information appears, which indicates that the address information of the station operating on the 6 GHz band is the address information in the first frame. When the indication information is a second value, the address information does not appear, which indicates that an address of the station operating on the 6 GHz band is a sending address of sending a frame that includes the 6 GHz operation information field, or a BSSID of the sender station that sends the frame that includes the 6 GHz operation information field.

In a possible implementation of the first aspect, an HE operation parameter field of the HE operation element of the first frame includes indication information for indicating whether the address information appears. When the indication information is a first value, the address information appears in the 6 GHz operation information field, which indicates that an address of the station operating on the 6 GHz band is a MAC address of the station operating on the 6 GHz band, or a BSSID of a BSS in which the station operating on the 6 GHz band is located. When the indication information is a second value, the address information does not appear in the 6 GHz operation information field, which indicates that an address of the station operating on the 6 GHz band is a sending address of sending a frame that includes the 6 GHz operation information field, or a BSSID of the sender station that sends the frame that includes the 6 GHz operation information field.

In a possible implementation of the first aspect, the address information is a MAC address of the station operating on the 6 GHz band or a BSSID of a BSS in which the station operating on the 6 GHz band is located.

In a possible implementation of the first aspect, when a BSSID of a BSS in which the station operating on the 6 GHz band is located is a BSSID in a BSSID set, the address information is a transmitted BSSID in the BSSID set.

In a possible implementation of the first aspect, the 6 GHz operation information field further includes TSF information and beacon frame information.

It should be understood that, the 6 GHz operation information field in the first frame that is sent by the sender station on the 2.4 GHz band and/or the 5 GHz band further includes the TSF information and the beacon frame information.

In this embodiment of this application, the sender station further indicates the TSF information and the beacon frame information. Therefore, the unassociated receiver station or the receiver station in the roaming state can infer a time at which the station operating on the 6 GHz band sends a beacon frame, and further learns of information about an associated BSS, after learning of the TSF information and the beacon frame information of the station operating on the 6 GHz band. This facilitates passive scanning.

In a possible implementation of the first aspect, the TSF information includes TSF difference information or a TSF value. The TSF difference information indicates a difference between a time stamp of an access point operating on the 6 GHz band and a time stamp of an access point that sends the first frame on the 2.4 GHz band and/or the 5 GHz band. The TSF value indicates the time stamp of the access point operating on the 6 GHz band.

In a possible implementation of the first aspect, the beacon frame information includes a beacon frame interval or a target beacon frame transmission time. The beacon frame interval indicates an interval at which the AP on 6 GHz transmits beacon frames. The target beacon frame transmission time indicates a transmission time of a latest beacon frame of the AP on 6 GHz.

In a possible implementation of the first aspect, the 6 GHz operation information field in the first frame further includes at least one of the following three parameters: a main channel, a channel bandwidth, and a channel central frequency.

In a possible implementation of the first aspect, the station operating on the 6 GHz band and the station that sends the first frame are co-located devices or belong to a same multi-band device.

According to a second aspect, an embodiment of this application provides an information indication method, including:

receiving a first frame on a 2.4 GHz band and/or a 5 GHz band, where the first frame includes address information of a station operating on a 6 GHz band; and sending a second frame on the 6 GHz band, where a receiving address of the second frame is an address in the address information.

It should be understood that, a receiver station receives the first frame on the 2.4 GHz band and/or the 5 GHz band, the first frame includes address information of a station operating on the 6 GHz band, and after obtaining the address information of the station operating on the 6 GHz band, the receiver station generates and sends the second frame whose receiving address is an address in the address information.

In this embodiment of this application, an unassociated receiver station or a receiver station in a roaming state can be accurately associated with and directionally communicate with the station operating on the 6 GHz band, after learning of the address of the station operating on the 6 GHz band.

Details of the information indication method in this embodiment of this application in the second aspect are the same as details in the first aspect. The details are not described herein again.

It may be understood that, the method in the first aspect or any possible implementation of the first aspect and the method in the second aspect or any possible implementation of the second aspect may be separately implemented or be combined for use. This is not limited in this embodiment of this application.

According to a third aspect, an embodiment of this application provides an information indication apparatus, configured to perform the method in the first aspect or any possible implementation of the first aspect, and/or the method in the second aspect or any possible implementation of the second aspect.

According to a fourth aspect, an embodiment of this application provides an information indication device, including a transceiver/transceiver pin and a processor. Optionally, the device further includes a memory. The transceiver/transceiver pin, the processor, and the memory communicate with each other by using an internal connection path. The processor is configured to execute an instruction to control the transceiver/transceiver pin to send or receive a signal. The memory is configured to store the instruction. When the processor executes the instruction, the processor executes the method in the first aspect or any possible implementation of the first aspect, and/or the method in the second aspect or any possible implementation of the second aspect.

According to a fifth aspect, an embodiment of this application provides a computer-readable storage medium, configured to store a computer program. The computer program includes an instruction for performing the method in the first aspect or any possible implementation of the first aspect, and/or an instruction for performing the method in the second aspect or any possible implementation of the second aspect.

According to a sixth aspect, an embodiment of this application provides a computer program product. The computer program product includes computer program code. When the computer program code is run on a computer, the computer is enabled to perform the method in the first aspect or any possible implementation of the first aspect, and/or the method in the second aspect or any possible implementation of the second aspect.

BRIEF DESCRIPTION OF DRAWINGS

FIG. 3 shows an HE operation element according to an embodiment of this application;

FIG. 4 shows a possible 6 GHz operation information field according to an embodiment of this application;

FIG. 5 shows an HE operation parameter field according to an embodiment of this application;

FIG. 6 shows another possible 6 GHz operation information field according to an embodiment of this application;

FIG. 7 shows another possible 6 GHz operation information field according to an embodiment of this application;

FIG. 8 shows a neighbor report element according to an embodiment of this application;

FIG. 9a shows a BSSID information field according to an embodiment of this application;

FIG. 9b shows another embodiment of a BSSID information field according to an embodiment of this application;

FIG. 10 shows a multi-BSSID element according to an embodiment of this application;

FIG. 11 shows a multi-BSSID sequence number element according to an embodiment of this application;

FIG. 12 is a block diagram of an information indication apparatus on an AP side according to an embodiment of this application;

FIG. 13 is a block diagram of an information indication apparatus on a STA side according to an embodiment of this application.

DESCRIPTION OF EMBODIMENTS

The following describes the technical solutions in the embodiments of this application with reference to the accompanying drawings in the embodiments of this application.

It should be understood that, the technical solutions in the embodiments of this application may be applied to various communications systems, such as: a Global System for Mobile Communications (GSM), a code division multiple access (CDMA) system, a wideband code division multiple Access (WCDMA) system, a general packet radio service (GPRS) system, a universal mobile telecommunications system (UMTS), a worldwide interoperability for microwave access (WiMAX) communications system, a future 5G communications system, or other various wireless communication systems using radio access technologies.

Figure 1:
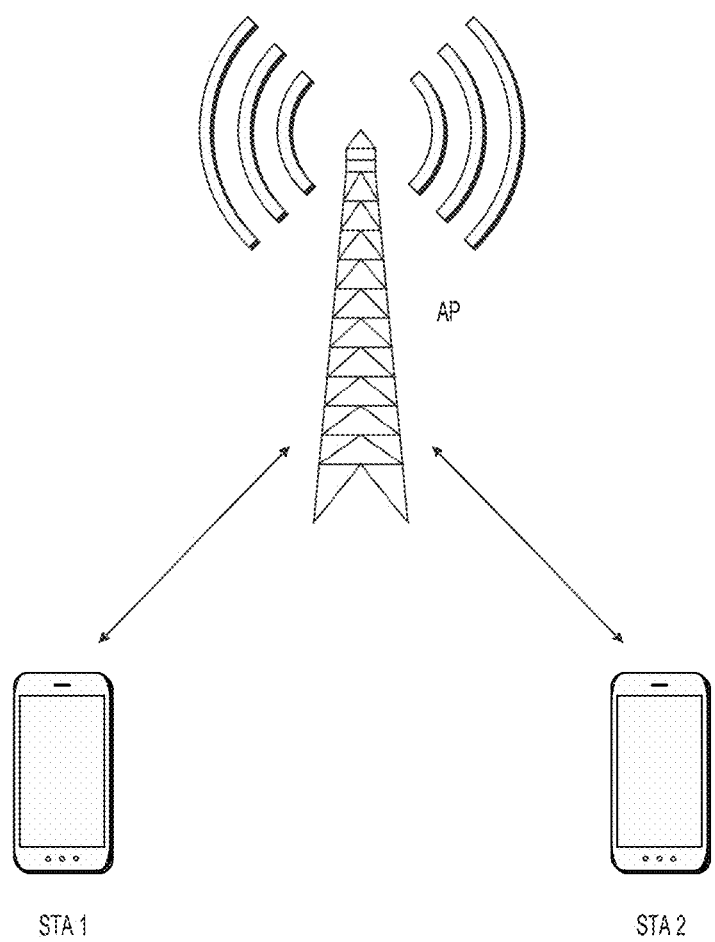
FIG. 1 is a possible application scenario according to an embodiment of this application.

FIG. 1 is a possible application scenario according to an embodiment of this application. It should be understood that, a station in this embodiment of this application includes an access station (AP, Access Point) and a non-access station STA (Non-AP Station). In other words, application scenarios of this embodiment of this application include scenarios in which an AP performs sending to a STA, a STA performs sending to an AP, an AP performs sending to an AP, and a STA performs sending to a STA. FIG. 1 is merely an example, and does not represent all application scenarios of this embodiment of this application.

A frequency range of a newly opened 6 GHz band is more than 1 GHz. An unassociated station or a station STA in a roaming state needs to actively scan the band more than 1 GHz to obtain information about a surrounding AP. The following manner is used: continuously switching to each channel of the band more than 1 GHz, sending a probe request frame Probe Request through broadcasting to obtain a probe response frame responded with by a surrounding AP, and then selecting an appropriate AP for association. However, disadvantages of this method are long duration, high energy consumption, and unnecessary congestion on the 6 GHz band. For example, (1) it is prohibited for the unassociated station or the station in the roaming state to send the broadcast probe request frame; (2) it is prohibited for the station to send an 802.11n data packet HT PPDU and an 802.11ac data packet VHT PPDU on 6 GHz; (3) BSS information on the 6 GHz band including a 6 GHz operation information field is broadcast on 2.4 GHz and 5 GHz, where the 6 GHz operation information field includes a BSS bandwidth, a main channel, and a channel access mechanism. The unassociated station or the station in the roaming state is associated with and communicates with the AP on 6 GHz by using the BSS information on the 6 GHz band that is received on 2.4 GHz/5 GHz.

The following describes the solutions in the embodiments of this application by using an example in which an AP sends a first frame to a STA on a 2.4 GHz band and/or a 5 GHz band.

Figure 2:
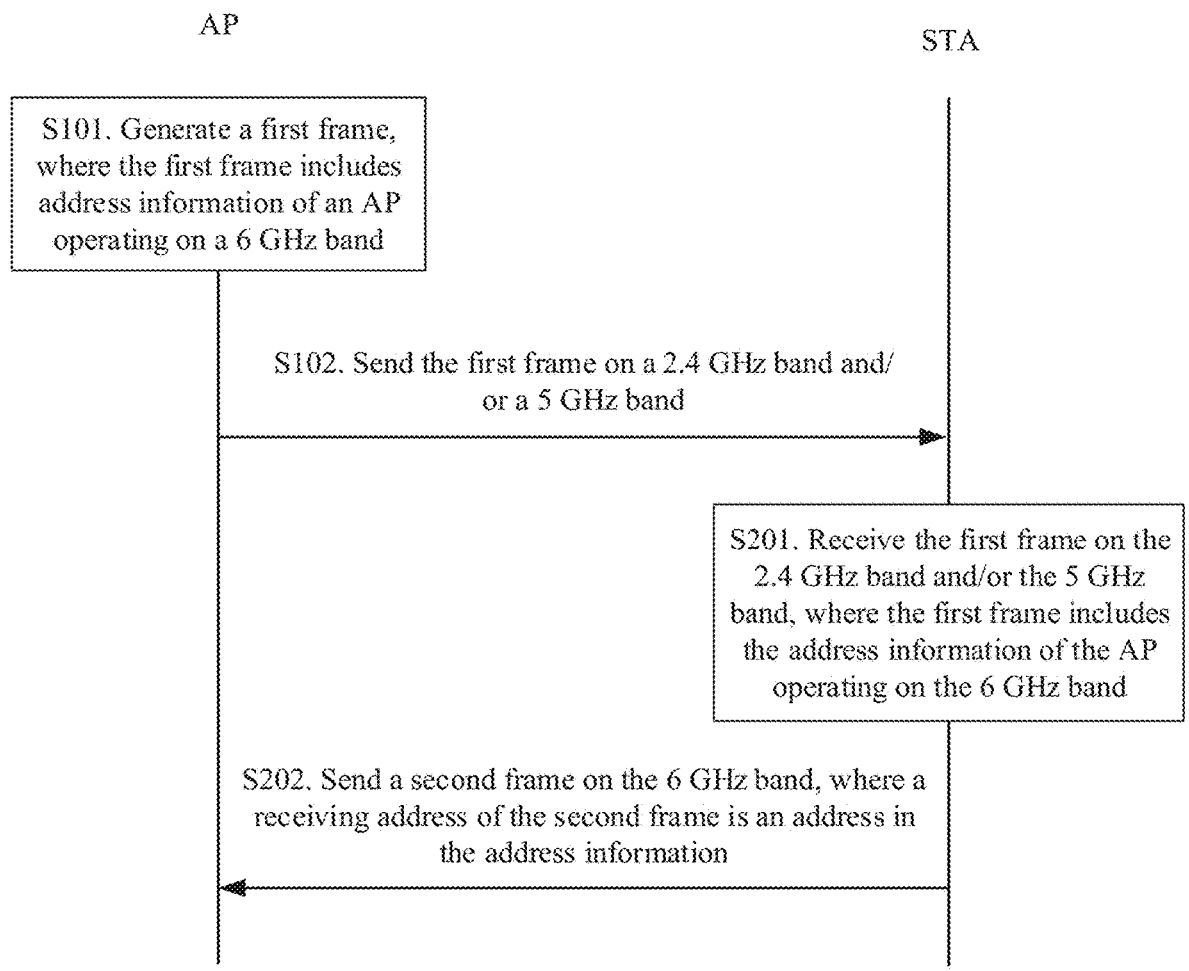
FIG. 2 is a flowchart of an information indication method according to an embodiment of this application.

FIG. 2 is a flowchart of an information indication method according to an embodiment of this application.

S101. An AP generates a first frame, where the first frame includes address information of an AP operating on a 6 GHz band.

In S101, specifically, the first frame generated by the AP may be a beacon frame, a probe response frame, a neighbor report frame, or another management frame. As shown in FIG. 3, a 6 GHz operation information field is newly added to an HE operation element included in the beacon frame, the probe response frame, the neighbor report frame, and another management frame. The address information is located in the 6 GHz operation information field. Other fields in the HE operation element are the same as other fields in an HE operation element in 802.11ax. For example, the other fields include an element ID (identifier) field, a length field, an element ID extension field, an HE operation parameter field, a BSS (basic service set) color information field, a basic HE-MCS (high efficiency-modulation and coding scheme) and NSS (number of spatial stream) set field, a VHT (very high throughput) operation information field, and a maximum co-located basic service set indication max co-located BSSID (BSS identifier) field.

FIG. 4 shows the 6 GHz operation information field. The 6 GHz operation information field includes a main channel field, a channel control field, a channel central frequency segment 0 field, a channel central frequency segment 1 field, and address information of a station operating on the 6 GHz band.

In a possible implementation, the address information is a MAC address of the station operating on the 6 GHz band, or a BSSID of a BSS in which the station operating on the 6 GHz band is located. In another possible implementation, when a BSSID of a BSS in which the station operating on the 6 GHz band is located is a BSSID in a BSSID set, the address information is a transmitted BSSID in the BSSID set rather than a non-transmitted BSSID. Only one BSSID in the BSSID set is a transmitted BSSID, and a remaining BSSID is a non-transmitted BSSID. An AP corresponding to the transmitted BSSID needs to transmit a beacon frame. The beacon frame includes a multi-BSSID element for indicating BSSIDs in the multi-BSSID set, and BSS information of the corresponding AP. An AP corresponding to the non-transmitted BSSID may transmit a beacon frame. However, the beacon frame does not include a multi-BSSID element.

In this embodiment of this application, by using the address information that is of the AP operating on the 6 GHz band and that is in the first frame, the AP can accurately indicate an address of the AP operating on the 6 GHz band. Therefore, an unassociated STA or a STA in a roaming state can be accurately associated with and directionally communicate with the AP operating on the 6 GHz band, after learning of the address of the AP operating on the 6 GHz band.

The channel control field includes a 4-bit channel bandwidth (values 0 to 3 respectively correspond to a 20 MHz channel bandwidth, a 40 MHz channel bandwidth, an 80 MHz channel bandwidth, and a 160 MHz channel bandwidth, and values 4 to 15 are reserved values and are not used), and a 4-bit channel access field (a value 0 indicates that EDCA is prohibited to be used to preempt a channel on a 6 GHz channel, a value 1 indicates that EDCA is allowed to be used to preempt a channel on the 6 GHz channel, and values 2 to 15 are reserved values and are not used). It should be noted that the channel access field mentioned in this embodiment may not exist. In this case, the STA is always allowed to contend for a channel on the 6 GHz band in the EDCA manner and send a frame to another STA after the preemption.

The main channel is a main channel on which the AP operates on 6 GHz. The channel bandwidth field, the channel central frequency segment 0 field, and the channel central frequency segment 1 field jointly indicate channel information of a BSS that is established by the AP on 6 GHz. The channel information includes a channel start frequency, a channel central frequency, a BSS bandwidth, and a frequency location of the main channel.

The channel central frequency segment 0 field and the channel central frequency segment 1 field are referred to as a channel central frequency. In a next generation of 802.11ax, for example, EHT, the bandwidth is further increased, and a quantity of frequency segments is further increased. In this case, a corresponding channel central frequency may include two or more segment fields. Setting methods are similar.

For a 20 MHz BSS bandwidth, a 40 MHz BSS bandwidth, and an 80 MHz BSS bandwidth, a channel central frequency segment 0 is set to a central frequency sequence number of a BSS bandwidth. For a 160 MHz BSS bandwidth, a channel central frequency segment 0 is set to a central frequency sequence number of primary 80 MHz of the 160 M BBS bandwidth. For a BSS bandwidth of 80 MHz+80 MHz, a channel central frequency segment 0 is set to a central frequency sequence number of primary 80 MHz.

For a 20 MHz BSS bandwidth, a 40 MHz BSS bandwidth, and an 80 MHz BSS bandwidth, a channel central frequency segment 1 field is a reserved value 0. For a 160 MHz BSS bandwidth, a channel central frequency segment 1 is set to a central frequency sequence number of the 160 MHz BBS bandwidth. For a BSS bandwidth of 80 MHz+80 MHz, a channel central frequency segment 1 is set to a central frequency sequence number of secondary 80 MHz.

A value of the channel bandwidth field and that of the channel central frequency 1 field jointly indicate the BSS bandwidth. This is specifically shown in Table 1.

TABLE 1

6 GHz HE BSS Bandwidth

| Channel bandwidth field | Channel central frequency 1 field | BSS bandwidth |
| --- | --- | --- |
| 0 | 0 | 20 MHz |
| 1 | 0 | 40 MHz |
| 2 | 0 | 80 MHZ |
| 3 | CCFS1 > 0 and \|CCFS1 − CCFS0\| = 8 | 160 MHZ |
| 3 | CCFS1 > 0 and \|CCFS1 − CCFS0\| > 16 | 80 MHz + 80 MHZ |

Note 1:
CCFS0 indicates a value of a channel central frequency 0 field
Note 2:
CCFS1 indicates a value of the channel central frequency 1 field The foregoing 6 GHz operation information field may be applied not only to 802.11ax, but also to the next generation of 802.1ax. In the next generation of 802.1ax, the channel bandwidth field in channel control field indicates that the bandwidth needs to be extended to more bandwidth sets, for example, 20 MHz, 40 MHz, 80 MHz, 160 MHz, and 320 MHz. In the next generation of 802.1ax, the 6 GHz operation information field may be included in an EHT operation element.

Referring to the HE operation element in the first frame, a specific structure of the HE operation parameter field in the HE operation element is shown in FIG. 5. The HE operation parameter field includes indication information for indicating whether the address information appears. One bit or one sub-field is used in the HE operation parameter field to indicate whether the address information appears in the 6 GHz operation information field. When the indication information for indicating whether the address information appears is a first value, for example, 1, the address information of the AP operating on the 6 GHz band appears in the 6 GHz operation information field, which indicates that the address information of the AP operating on the 6 GHz band is the address information in the 6 GHz operation information field, for example, a MAC address of the AP operating on the 6 GHz band or a BSSID of a BSS in which the AP operating on the 6 GHz band is located. When the indication information for indicating whether the address information appears is a second value, for example, 0, the address information of the AP operating on the 6 GHz band does not appear in the 6 GHz operation information field, which indicates that the address information of the AP operating on the 6 GHz band is a sending address of a frame (except a neighbor report frame or a frame including a neighbor element) for sending the 6 GHz operation information field, or a BSSID of the AP that sends the 6 GHz operation information field. When the first frame is the neighbor report frame or the frame including the neighbor element, and the indication information for indicating whether the address information appears is the second value, for example, 0, the address information of the AP operating on the 6 GHz band does not appear in the 6 GHz operation information field, which indicates that the address information of the AP operating on the 6 GHz band is a BSSID in the neighbor report frame for sending the 6 GHz operation information field or a BSSID in the neighbor element of the frame including the neighbor element.

In another implementation, if an address information appearance field of the HE operation parameter field does not exist, the "address information of the station operating on the 6 GHz band" field of the 6 GHz operation information field keeps appearing.

As shown in FIG. 5, the HE operation parameter field further includes a 6 GHz operation information appearance field for indicating whether the 6 GHz operation information field appears. When a value of the 6 GHz operation information appearance field is set to a first value, for example, 1, it indicates that the 6 GHz operation information field appears in the HE operation element, and implicitly indicates that the AP also establishes a BSS on 6 GHz. When the value of the 6 GHz operation information field is set to a second value, for example, 0, it indicates that the 6 GHz operation information field does not appear in the HE operation element, and implicitly indicates that the AP does not establish a BSS on 6 GHz.

As shown in FIG. 5, other indication bits in the HE operation parameter field are the same as those in an HE operation parameter field in 802.11ax. The other indication bits include default PE (packet extension) duration, a TWT (target wake-up time) request, a TXOP (transmission of opportunity) duration RTS (require to send) threshold, VHT operation information appearance, a basic service set co-located BSS, ER SU (extended range single user) prohibition, a 6 GHz operation information appearance indication bit, and the like.

Further, the 6 GHz operation information field further includes TSF information and beacon frame information. The TSF information includes TSF difference information or a TSF value. The beacon frame information includes a beacon frame interval or a target beacon frame transmission time. The TSF difference information indicates a difference between a time stamp of an AP operating on 6 GHz and a time stamp of an AP that transmits the 6 GHz information field on 2.4 GHz and/or 5 GHz. The TSF value indicates the time stamp of the AP operating on 6 GHz. The beacon frame interval indicates an interval at which the AP on 6 GHz transmits beacon frames. The target beacon frame transmission time indicates a transmission time of a latest beacon frame of the AP on 6 GHz. TSF (time stamp field) difference information/a TSF value and the beacon frame interval/the target beacon frame transmission time are newly added to the 6 GHz operation information field. In the four parameters, the first two parameters are TSF parameters, and the following two parameters are beacon frame parameters. Any one of the first two parameters may be combined with any one of the following two parameters. For example, as shown in FIG. 6, the TSF difference information and the beacon frame interval are newly added to the 6 GHz operation information field; as shown in FIG. 7, the TSF value and the target beacon frame transmission time are newly added to the 6 GHz operation information field.

In another implementation, a target beacon frame transmission time difference needs to be added to the 6 GHz operation information field. The target beacon frame transmission time difference indicates a difference between a target beacon frame transmission time of the AP on 6 GHz and the AP that transmits the 6 GHz operation information field on 2.4 GHz/5 GHz.

It should be noted that a quantity of bytes occupied by each newly added parameter in the foregoing figure may also be another byte quantity. For example, the TSF difference information occupies one byte.

In this embodiment of this application, the AP newly adds the TSF information and the beacon frame information to the 6 GHz operation information field. Therefore, an unassociated STA or a STA in a roaming state can infer a time at which the AP operating on the 6 GHz band sends a beacon frame, and effectively listen to a corresponding channel on the 6 GHz band for the beacon frame sent by the AP operating on the 6 GHz band to further learn of information about an associated BSS and clock synchronization information of the AP operating on the 6 GHz band, after learning of the TSF information and the beacon frame information of the AP operating on the 6 GHz band. This facilitates passive scanning.

S102. The AP sends the first frame on the 2.4 GHz band and/or the 5 GHz band.

S201. The STA receives the first frame on the 2.4 GHz band and/or the 5 GHz band, where the first frame includes the address information of the AP operating on the 6 GHz band.

In S201, the STA receives the first frame in S101 on the 2.4 GHz band and/or the 5 GHz band. The first frame includes the 6 GHz operation information field, and the 6 GHz operation information field includes a main channel, a channel bandwidth, a channel central frequency, and the address information of the AP operating on the 6 GHz band.

After the STA receives the 6 GHz operation information field, if a value of the channel access field in the 6 GHz operation information field is set to allowing preemption of a channel on the 6 GHz band through EDCA (enhanced distributed channel access), the STA sends a probe request frame to the AP on the main channel indicated by BSS information on the 6 GHz band, then obtains a probe response frame responded with by the AP, and is further associated with the AP by using subsequent processes of exchanging an authentication request frame/an authentication response frame, an association request frame/an association response frame, and the like.

S202. The STA sends a second frame on the 6 GHz band, where a receiving address of the second frame is an address in the address information or a sending address of sending the first frame/a BSSID field of the first frame.

In S202, as described in S201, the STA sends the second frame to the AP on the main channel indicated by the BSS information on the 6 GHz band, and the receiving address of the second frame is the address in the address information. For example, the STA performs active scanning or passive scanning on the main channel indicated by the BSS information on the 6 GHz band. For example, the STA sends the probe request frame to the AP, and a receiving address of the probe request frame is set to the address information that is of the station operating on the 6 GHz band and that is in the 6 GHz operation information field, for example, in the 6 GHz operation information field, a MAC address of the station operating on the 6 GHz band or a BSSID of a BSS in which the station operating on the 6 GHz band is located.

The BSSID field in the second frame is set to the BSSID field or the MAC address field of the AP in the 6 GHz operation information field.

In another possible manner of setting the receiving address of the probe request frame, when indication information for indicating whether the address information appears is a first value, for example, 1, the receiving address of the request frame is set to address information that is of an AP operating on the 6 GHz band and that is in the 6 GHz operation information field, for example, in the 6 GHz operation information field, a BSSID of the AP operating on the 6 GHz band or a MAC address of the AP operating on the 6 GHz band.

The BSSID field in the second frame is set to the BSSID field or the MAC address field of the AP in the 6 GHz operation information field. When the indication information for indicating whether the address information appears is a second value, for example, 0, the receiving address of the request frame is set to a sending address of a frame (except a neighbor report frame or a frame including a neighbor element) for sending the 6 GHz operation information field, or a BSSID of the AP that sends the 6 GHz operation information field.

When the first frame is the neighbor report frame or the frame including the neighbor element, and the indication information for indicating whether the address information appears is the second value, for example, 0, the address information of the AP operating on the 6 GHz band does not appear in the 6 GHz operation information field, which indicates that the address information of the AP operating on the 6 GHz band is the receiving address of the second frame and the receiving address of the second frame is set to a BSSID in the neighbor report frame for sending the 6 GHz operation information field or a BSSID in the neighbor element of the frame including the neighbor element.

The BSSID field in the second frame is set to a BSSID field in the frame that carries the HE Operation Element (except the neighbor report frame or the frame including the neighbor element) and is used to send the HE operation element; or is set to a BSSID in the neighbor report frame for sending the 6 GHz operation information field, or a BSSID in the neighbor element in the frame including the neighbor element.

In another possible manner of setting the receiving address of the probe request frame, when the AP operating on the 6 GHz band corresponds to a BSSID of a BSSID set, that is, the AP operates in a virtual BSS state, a receiving address of the probe request frame that is sent by the STA on the 6 GHz band is a transmitted BSSID, and an AP of the transmitted BSSID responds with a probe response frame including information about a multi-BSSID element and another non-transmitted BSSID. After receiving the probe response frame responded with by the AP of the transmitted BSSID, the STA may further select an appropriate virtual AP for association based on information about each AP, for example, a BSS load status.

It should be noted that if the channel access field in the 6 GHz operation information field is set to not allowing preemption of a channel on 6 GHz through EDCA, the STA cannot actively preempt a channel on the 6 GHz band through the EDCA manner to send a data packet to the AP, but can only be associated with the AP through passive scanning. For example, the STA listens to a beacon frame, and then is associated with the AP based on information included in the obtained beacon frame; or the STA waits for the AP to send a trigger frame, and sends an information frame of an association request in response to the trigger frame to be associated with the AP. The information frame of the association request includes a probe request frame, an authentication request frame, an association request frame, and the like.

Processes of exchanging the probe request frame/the probe response frame, the authentication request frame/the authentication response frame, and the association request frame/the association response frame are all related to two handshakes. To be specific, the STA first sends a request frame, and receives an acknowledgement frame responded with by the AP; then the AP sends a response frame; and finally the STA replies with an acknowledgement frame.

When a neighbor AP operates on the 6 GHz band, and a BSSID of a BSS in which the neighbor AP is located is a BSSID in the BSSID set, that is, the neighbor AP operates in a virtual BSS state, this embodiment of this application further provides the following solutions:

The AP sends a management frame (for example, a neighbor report frame) on a 2.4 GHz/5 GHz/6 GHz band or the like (or may be another band). The management frame includes a neighbor report element. As shown in FIG. 8, the neighbor report element includes an element ID field, a length field, a BSSID field, a BSSID information field, an operation class field, a channel number field, a PHY type field, and an optional sub-element field.

The operation class field and the channel number field jointly indicate a band on which the neighbor AP operates, and the channel number indicates a main channel on which the neighbor AP operates.

As shown in FIG. 9a, a co-location AP field is added to the BSSID information. The co-location AP field is set to a first value. For example, the co-location AP field is set to "1", which indicates that a neighbor AP corresponding to the BSSID in the neighbor report element and an AP that sends the neighbor report element are co-located, that is, share a same antenna interface share the same antenna connector (or the two APs are a in multi-band device). The co-location AP field is set to a second value. For example, the co-location AP field is set to "0", which indicates that a neighbor AP corresponding to the BSSID in the neighbor report element and an AP that sends the neighbor report element are not co-located, that is, does not share a same antenna interface share the same antenna connector (or the two APs are not a multi-band device).

When the co-location AP field in the BSSID information is set to the first value, the neighbor AP operates on the 6 GHz band, and the BSSID of the BSS in which the neighbor AP is located is a BSSID in the BSSID set, that is, the neighbor AP operates in the virtual BSS state, an optional sub-element in the neighbor report element in FIG. 8 includes a multi-BSSID element. As shown in FIG. 10, the multi-BSSID element includes an element ID, a length, a maximum BSSID indication, and an optional sub-element. The maximum BSSID indication indicates that a maximum quantity of BSSIDs included in the multi-BSSID set is n. The optional sub-element includes information about each non-transmitted BSSID. In this case, the BSSID in the neighbor report element shown in FIG. 8 is a reference BSSID for calculating a value of each BSSID in the BSSID set. The receive-end STA may calculate the value of each BSSID in the multi-BSSID set based on the reference BSSID and the maximum BSSID indication. Values of high-order (48-n) bits of each BSSID in the multi-BSSID set are the same as values of high-order (48-n) bits of the reference BSSID. Values of low-order n bits of each BSSID in the multi-BSSID set are obtained through performing modulo on $2^n$ and a sum of a value of a sequence number n of the BSSID and each of values of low-order n bits of the reference BSSID. For a specific calculation method, refer to the 802.11-2016 standard protocol.

When the co-location AP field in the BSSID information is set to a first value, the neighbor AP operates on the 6 GHz band, and the BSSID of the BSS in which the neighbor AP is located is a BSSID in the BSSID set, that is, the neighbor AP operates in the virtual BSS state, an optional sub-element in the neighbor report element in FIG. 8 includes a multi-BSSID element, and information indicating the transmitted BSSID further needs to be added. In a manner, the neighbor report element further needs to include a multi-BSSID sequence number element. As shown in FIG. 11, the multi-BSSID sequence number element includes an element ID, a length, a BSSID sequence number, a DTIM period (optional), and a DITM count (optional). The BSSID sequence number indicates a location n of the BSSID in the multi-BSSID set. In this case, the BSSID sequence number in FIG. 11 is a sequence number of the transmitted BSSID.

In another manner, a 1-byte BSSID sequence number or a 6-byte transmitted BSSID field is directly added to the neighbor report element.

In a possible implementation, in FIG. 9a, the co-location AP field may be extended to a field. The extended field is referred to as a co-location multi-band AP field. A first value of the co-location multi-band AP field such as 0 indicates that a reported AP is not a multi-band AP. A second value of the co-location multi-band AP field such as 1 indicates that the reported AP is a first reported AP of the multi-band AP. A third value of the co-location multi-band AP field such as 2 indicates that the reported AP is a last reported AP of the multi-band AP. A fourth value of the co-location multi-band AP field such as 3 indicates that the reported AP is an intermediate reported AP in the multi-band AP. There may be a plurality of intermediate reported APs. A fifth value of the co-location multi-band AP field such as 4 indicates that the reported AP and the reporting AP may be co-located.

In another possible implementation, in FIG. 9a, the co-location AP field indicates only whether the neighbor AP corresponding to the BSSID in the neighbor report element and the AP that sends the neighbor report element are co-located.

In FIG. 9b, a multi-band field is added to indicate whether the neighbor AP indicated by the BSSID in the neighbor report element is located in a multiple-band device, wherein the multiple-band comprises 6 GHz band.

The reported AP may also be referred to as a neighbor AP or an AP indicated by the BSSID in the neighbor element, and the reporting AP is an AP that transmits a neighbor report element.

| Co-location AP | Multi-band | Meaning |
| --- | --- | --- |
| 1 | 1 | The AP indicated by the BSSID in the neighbor element and the reporting AP are co-located devices and belong to a same multi-band device. |
| 0 | 1 | The AP indicated by the BSSID in the neighbor element is a device that supports a plurality of bands, but is not co-located with the reporting AP or does not belong to a same multi-band device with the reporting AP. |

| Co-location AP | Multi-band | Meaning |
| --- | --- | --- |
| 0 | 0 | The AP indicated by the BSSID in the neighbor element is not a device that supports a plurality of bands, and is not co-located with the reporting AP or does not belong to a same multi-band device with the reporting AP. |
| 1 | 0 | It is meaningless or reserved. Alternatively, the AP indicated by the BSSID in the neighbor element is not a device that supports a plurality of bands, and the AP indicated by the BSSID in the neighbor element and the reporting AP are co-located devices but do not belong to a same multi-band device. |

On a STA side, the STA receives a management frame (for example, a neighbor report frame) sent by the AP. The management frame includes a neighbor report element. If the co-location AP field in the BSSID information field of the neighbor report element is set to 1, it indicates that the neighbor AP corresponding to the BSSID field operates on the 6 GHz band. Based on the BSSID, an operation class, and a channel number, the STA sends, on a channel indicated by the channel number on corresponding 6 GHz, a unicast information frame of an association request to a neighbor AP operating on the 6 GHz band, so that the neighbor AP performs association and communication. The information frame of the association request includes frames such as a probe request frame, an authentication request frame, and an association request frame. If the co-location AP in the BSSID information field is set to 0, the STA continues to listen to a channel.

The foregoing method is based on prohibition on an unassociated station or a station in a roaming state from sending a broadcast probe request frame. In another implementation, the unassociated station or the station in the roaming state is prohibited from sending a broadcast probe request frame whose BSSID field is wildcard BSSID and/or whose S SID element is wildcard SSID, and the unassociated station or the station in the roaming state is allowed to send a broadcast probe request frame whose BSSID field is not wildcard BSSID or whose SSID element is not wildcard SSID. In this case, after surrounding APs receive the broadcast probe request frame, only an AP that meets a condition responds with a probe response frame, rather than all the surrounding APs respond with probe response frames. The condition is as follows: 1. An SSID of an extended service set ESS (extended service set) of the AP matches the SSID of the received probe request frame; 2. A BB SID of the AP matches the BSSID of the received probe request frame.

On an AP side, a frame for sending a 6 GHz information field carries a MAC address or a BSSID of an AP, or a frame for sending a neighbor report element carries a MAC address or a BSSID of a neighbor AP. Alternatively, a frame for sending a neighbor report element carries an SSID of an ESS in which a neighbor AP is located, and carries an SSID element or an SSID list element as a sub-element of the neighbor element.

On the STA side, the BSSID field in the broadcast probe request frame sent by the station needs to be set to the BSSID in the 6 GHz information field, or the sending address or the BSSID field in the frame for sending the 6 GHz information field, or the BS SID in the neighbor report element, or the transmitted BSSID indicated in the neighbor report element. The SSID instead of the wildcard S SID is specified by the SSID element in the broadcast probe request frame. Optionally, an SSID list element is further carried. The specified SSID is from an SSID element or an SSID list element included in the received frame carrying the neighbor report element.

The foregoing embodiments of this application provide an information indication method. The following embodiments of this application provide an information indication apparatus. It should be understood that the information indication apparatus in the embodiments of this application has any function of the information indication apparatus in the foregoing method.

As shown in FIG. 12, an information indication apparatus includes:
a processing unit 101, configured to generate a first frame, where the first frame includes address information of a station operating on a 6 GHz band; and a transceiver unit 102, configured to send the first frame on a 2.4 GHz band and/or a 5 GHz band.

The information indication apparatus shown in FIG. 12 has any function of the sender station (for example, an AP) in the foregoing method. Details are not described herein again. For details, refer to the description of the foregoing method.

As shown in FIG. 13, an information indication apparatus includes:
a transceiver unit 201, configured to: receive a first frame on a 2.4 GHz band and/or a 5 GHz band, where the first frame includes address information of a station operating on a 6 GHz band; and send a second frame on the 6 GHz band; and
a processing unit 202, configured to: generate the second frame, where a receiving address of the second frame is an address in the address information; and control the transceiver unit 201 to send the second frame on the 6 GHz band.

The information indication apparatus shown in FIG. 13 has any function of the station (for example, a STA) in the foregoing method. Details are not described herein again. For details, refer to the description of the foregoing method.

The information indication apparatus provided in the foregoing embodiments of this application may be implemented in a plurality of product forms. For example, the information indication apparatus may be configured as a general-purpose processing system. For example, the information indication apparatus may be implemented by using a general bus architecture. For example, the information indication apparatus may be implemented by an ASIC (application-specific integrated circuit), and so on. The following provides several possible product forms of the information indication apparatus in the embodiments of this application. It should be understood that the following is merely an example, and the possible product forms in the embodiments of this application are not limited thereto.

Figure 14:
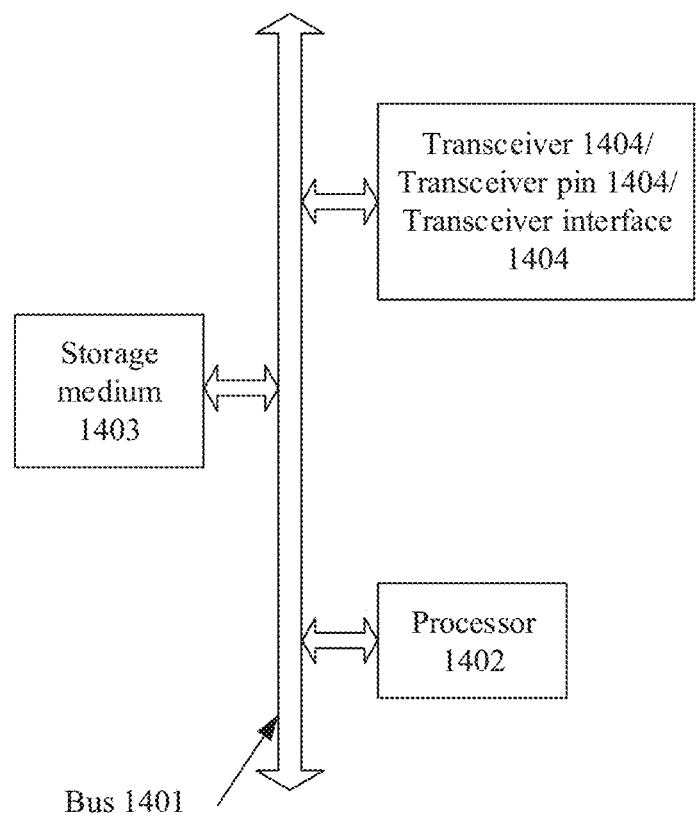
FIG. 14 is a diagram of a possible product from according to an embodiment of this application.

FIG. 14 is a structural diagram of a possible product form of an information indication apparatus according to an embodiment of this application.

In a possible product form, the information indication apparatus may be an information indication device, and the information indication device includes a processor 1402 and a transceiver 1404. Optionally, the information indication device may further include a storage medium 1403.

In another possible product form, the information indication apparatus is also implemented by a general-purpose processor that is, implemented by a commonly called chip. The general-purpose processor includes a processor 1402 and a transceiver interface 1404/transceiver pin 1404. Optionally, the general-purpose processor may further include a storage medium 1403.

In another possible product form, the information indication apparatus may also be implemented by using the following components: one or more FPGAs (field programmable gate arrays), a PLD (programmable logic device), a controller, a state machine, a gate logic, a discrete hardware component, any other suitable circuit, or any combination of circuits that can perform various functions described in this application.

It should be understood that, the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

A person of ordinary skill in the art may be aware that, in combination with the examples described in the embodiments disclosed in this specification, method steps and units may be implemented by electronic hardware, computer software, or a combination thereof. To clearly describe the interchangeability between the hardware and the software, the foregoing has generally described steps and compositions of each embodiment according to functions. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments in this application.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in a form of a software product. The software product is stored in a storage medium and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific embodiments of this application, but are not intended to limit the protection scope of this application. Any modification or replacement readily figured out by a person skilled in the art within the technical scope disclosed in this application shall fall within the protection scope of this application. Therefore, the protection scope of this application shall be subject to the protection scope of the claims.

The invention claimed is:

1. An information indication method, comprising:
   determining address information of a station operating on a 6 GHz band, and whether a neighbor access point (AP) and a reporting AP are co-located, and whether the neighbor AP is located in a multiple-band device that supports multiple bands including the 6 GHz band, wherein the reporting AP is not a 6 GHZ AP;
   based on the determining, generating a first frame by:
      including the address information of the station operating on the 6 GHz band in a 6 GHz operation information field of a high efficiency (HE) operation element of the first frame,
      indicating whether the neighbor AP and the reporting AP are co-located by using a co-location AP field in a basic service set identifier (BSSID) information field in the first frame,
      indicating whether the neighbor AP is located in the multiple-band device that supports multiple bands including the 6 GHz band by using a multi-band field in the first frame; and
      setting the co-location AP field to a first value to indicating that the neighbor AP operates on the 6 GHz band and a BSSID of a basic service set (BSS) in which the neighbor AP is located is a BSSID in a BSSID set; and sending the first frame on at least one of a 2.4 GHz band or a 5 GHz band to indicate whether the neighbor AP and the reporting AP are co-located.

2. The method according to claim 1, wherein an HE operation parameter field of the HE operation element of the first frame comprises indication information for indicating whether the address information appears.

3. The method according to claim 1, wherein the address information is a medium access control (MAC) address of the station operating on the 6 GHz band or a BSSID in the BSS.

4. The method according to claim 3, wherein the address information is a transmission BSSID in the BSSID set.

5. The method according to claim 1, wherein the 6 GHz operation information field further comprises Timing synchronization function (TSF) information and beacon frame information.

6. The method according to claim 5, wherein the TSF information comprises TSF difference information or a TSF value; and the TSF difference information indicates a difference between a time stamp of an access point operating on the 6 GHz band and a time stamp of an access point that sends the first frame on at least one of the 2.4 GHz band or the 5 GHz band, and the TSF value indicates the time stamp of the access point operating on the 6 GHz band.

7. The method according to claim 5, wherein the beacon frame information comprises a beacon frame interval or a target beacon frame transmission time; and the beacon frame interval indicates an interval at which an access point (AP) on 6 GHz transmits beacon frames, and the target beacon frame transmission time indicates a transmission time of a latest beacon frame of the AP on 6 GHz.

8. The method according to claim 1, wherein the 6 GHz operation information field in the first frame further comprises at least one of the following three parameters: a main channel, a channel bandwidth, or a channel central frequency.

9. The method according to claim 1, wherein the station operating on the 6 GHz band and the station that sends the first frame are co-located devices or belong to a same multi-band device.

10. The method according to claim 1, wherein the first frame comprises a sub-element field, the sub-element field includes a multi-BSSID element, the multi-BSSID element includes an element ID subfield, a length subfield, a maximum BSSID indication subfield, and a sub-element subfield, and generating the first frame comprising using the maximum BSSID indication subfield to indicate that a maximum quantity of BSSIDs included in the BSSID set, the sub-element subfield includes information about each non-transmitted BSSID.

11. An information indication method, comprising:
receiving a first frame on at least one of a 2.4 GHz band or a 5 GHz band, wherein the first frame comprises address information of a station operating on a 6 GHz band, wherein the address information is located in a 6 GHz operation information field of a high efficiency (HE) operation element of the first frame, and wherein the first frame further comprises a basic service set identifier (BSSID) information field, the BSSID information field comprises a co-location access point (AP) field, the co-location AP field indicates whether a neighbor AP and a reporting AP are co-located, wherein the reporting AP is not a 6 GHz AP, wherein the first frame comprises a multi-band field that indicates whether the neighbor AP is located in a multiple-band device that supports multiple bands including the 6 GHz band;
determining the address information based on the 6 GHz operation information field of the HE operation element of the first frame, determining whether the neighbor AP and the reporting AP are co-located based on the co-location AP field in the BSSID information field in the first frame, determining whether the neighbor AP is located in the multiple-band device that supports multiple bands including the 6 GHz band based on the multi-band field in the first frame, and determining whether the neighbor AP operates on the 6 GHz band and whether a BSSID of a basic service set (BSS) in which the neighbor AP is located is a BSSID in a BSSID set based on the co-location AP field; and
sending a second frame on the 6 GHz band, wherein a receiving address of the second frame is an address in the address information.

12. The method according to claim 11, wherein an HE operation parameter field of the HE operation element of the first frame comprises indication information for indicating whether the address information appears.

13. The method according to claim 11, wherein the address information is a medium access control (MAC) address of the station operating on the 6 GHz band or a BSSID in the BSS.

14. The method according to claim 13, wherein the address information is a transmission BSSID in the BSSID set.

15. The method according to claim 11, wherein the 6 GHz operation information field further comprises Timing synchronization function (TSF) information and beacon frame information.

16. The method according to claim 15, wherein the TSF information comprises TSF difference information or a TSF value; and the TSF difference information indicates a difference between a time stamp of an access point operating on the 6 GHz band and a time stamp of an access point that sends the first frame on at least one of the 2.4 GHz band or the 5 GHz band, and the TSF value indicates the time stamp of the access point operating on the 6 GHz band.

17. The method according to claim 15, wherein the beacon frame information comprises a beacon frame interval or a target beacon frame transmission time; and the beacon frame interval indicates an interval at which an access point (AP) on 6 GHz transmits beacon frames, and the target beacon frame transmission time indicates a transmission time of a latest beacon frame of the AP on 6 GHz.

18. The method according to claim 11, wherein the 6 GHz operation information field in the first frame further comprises at least one of the following three parameters: a main channel, a channel bandwidth, or a channel central frequency.

19. An apparatus, comprising:
at least one processor configured to execute programming instructions to cause the apparatus to:
determine address information of a station operating on a 6 GHz band, and whether a neighbor access point (AP) and a reporting AP are co-located, and whether the neighbor AP is located in a multiple-band device that supports multiple bands including the 6 GHz band, wherein the reporting AP is not a 6 GHz AP;
based on the determining, generate a first frame by:
including the address information of the station operating on the 6 GHz band in a 6 GHz operation information field of a high efficiency (HE) operation element of the first frame, indicating whether the neighbor AP and the reporting AP are co-located by using a co-location AP field in a basic service set identifier (BSSID) information field in the first frame, indicating whether the neighbor AP is located in the multiple-band device that supports multiple bands including the 6 GHz band by using a multi-band field in the first frame; and setting the co-location AP field to a first value to indicating that the neighbor AP operates on the 6 GHz band and a BSSID of a basic service set (BSS) in which the neighbor AP is located is a BSSID in a BSSID set; and send the first frame on at least one of a 2.4 GHz band or a 5 GHz band to indicate whether the neighbor AP and the reporting AP are co-located.

20. The apparatus according to claim 19, wherein the first frame comprises a sub-element field, the sub-element field includes a multi-BSSID element, the multi-BSSID element includes an element ID subfield, a length subfield, a maximum BSSID indication subfield, and a sub-element subfield, and generating the first frame comprising using the maximum BSSID indication subfield to indicate that a maximum quantity of BSSIDs included in the BSSID set, the sub-element subfield includes information about each non-transmitted BSSID.

* * * * *